(12) United States Patent
Kaltenegger et al.

(10) Patent No.: US 10,838,795 B2
(45) Date of Patent: Nov. 17, 2020

(54) MONITORING CIRCUIT WITH A SIGNATURE WATCHDOG

(75) Inventors: Martin Kaltenegger, Graz (AT); Simon Brewerton, Trowbridge (GB); Michael Hausmann, Gleisdorf (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 590 days.

(21) Appl. No.: 13/542,470

(22) Filed: Jul. 5, 2012

(65) Prior Publication Data

US 2014/0009166 A1 Jan. 9, 2014

(51) Int. Cl.
*G06F 11/07* (2006.01)
(52) U.S. Cl.
CPC ...... *G06F 11/0757* (2013.01); *G06F 11/0706* (2013.01); *G06F 11/0739* (2013.01)
(58) Field of Classification Search
CPC ..................................................... G01R 23/10
See application file for complete search history.

(56) References Cited

U.S. PATENT DOCUMENTS

| | | | |
|---|---|---|---|
| 3,810,101 A * | 5/1974 | Avery | ............................ 710/110 |
| 4,227,798 A | 10/1980 | Steiner | |
| 4,276,451 A | 6/1981 | Beebe et al. | |
| 4,514,846 A | 4/1985 | Federico et al. | |
| 4,683,530 A | 7/1987 | Quatse | |
| 4,733,923 A | 3/1988 | Dahnert | |
| 5,130,710 A | 7/1992 | Salazar | |
| 5,897,596 A | 4/1999 | Kabune et al. | |
| 5,970,936 A * | 10/1999 | Cabrera | ............... F02N 11/0848 123/179.3 |
| 6,795,118 B1 * | 9/2004 | Cho | ............................... 348/246 |
| 6,886,123 B1 * | 4/2005 | Chren, Jr. | ...................... 714/733 |
| 7,225,369 B2 | 5/2007 | Schumacher et al. | |
| 7,590,509 B2 * | 9/2009 | Riedlinger et al. | ........... 702/182 |
| 7,894,917 B2 * | 2/2011 | Weatherhead et al. | .......... 700/14 |
| 2005/0273666 A1 * | 12/2005 | Ioku | ..................... G06F 11/3676 714/38.12 |
| 2006/0248410 A1 * | 11/2006 | Circello | ................ G06F 11/348 714/38.13 |
| 2008/0008035 A1 * | 4/2008 | Yamawaki et al. | ........... 369/100 |

(Continued)

FOREIGN PATENT DOCUMENTS

| | | |
|---|---|---|
| CN | 2713538 Y | 7/2005 |
| CN | 101216798 A | 7/2008 |

(Continued)

OTHER PUBLICATIONS

Ghosh, A., et al., "Safety Evaluation Using Behavioral Simulation Modes," Proceedings of IEEE Annual Reliability and Maintainability Symposium, 1996, pp. 82-89.

(Continued)

*Primary Examiner* — Tung X Nguyen
*Assistant Examiner* — Feba Pothen
(74) *Attorney, Agent, or Firm* — Slater Matsil, LLP

(57) ABSTRACT

A method can be used for monitoring a processing circuit. The processing circuit generates a response to a request and the response is compared with an expected response. A pass pulse is generated when the response matches the expected response. The causing, comparing and generating steps are repeated a number of times A frequency at which pass pulses occur is evaluated.

33 Claims, 10 Drawing Sheets

(56) References Cited

U.S. PATENT DOCUMENTS

| | | | | |
|---|---|---|---|---|
| 2009/0100125 A1* | 4/2009 | McDowell | ........ | G06F 17/30902 709/203 |
| 2012/0191393 A1* | 7/2012 | Satou et al. | ................... | 702/78 |
| 2013/0110414 A1* | 5/2013 | Caponetti et al. | .............. | 702/35 |

FOREIGN PATENT DOCUMENTS

| | | |
|---|---|---|
| CN | 101980171 A | 2/2011 |
| CN | 102521060 A | 6/2012 |
| DE | 102004022624 A1 | 12/2005 |
| DE | 102008043648 A1 | 5/2010 |
| EP | 0 658 842 A1 | 6/1995 |
| EP | 0 996 060 A2 | 4/2000 |
| GB | 1 458 200 A | 12/1976 |
| JP | 59-020061 A | 2/1984 |

OTHER PUBLICATIONS

Hughes-Fenchel, G., "A Flexible Clustered Approach to High Availability," Twenty-Seventh Annual International Symposium on Fault-Tolerant Computing, FTCS-27, Digest of Papers, Jun. 24-27, 1997, pp. 314-318.

Mahmood, A., et al., "Concurrent Error Detection Using Watchdog Processors—A Survey," IEEE Transactions on Computers, vol. 37, No. 2, Feb. 1988, pp. 160-174.

Majzik, I., "Concurrent Error Detection Using Watchdog Processors," downloaded from http://home.mit.bme.hu/~majzik/wp/conerr/, Sep. 12, 2012, 26 pages.

"Processor Supervisory Circuits with Window-Watchdog," Texas Instruments Production Data, SLVS331E, Dec. 2000, 18 pages.

\* cited by examiner

MONITORING CIRCUIT WITH A SIGNATURE WATCHDOG

TECHNICAL FIELD

Embodiments of the present invention relate to a monitoring circuit, in particular a monitoring circuit with a signature watchdog, and to a method for monitoring a processing circuit.

BACKGROUND

A signature watchdog provides supervision for processing circuits (processors), such as CPUs (Central Processor Units), DSPs (Digital Signal Processors), microcontrollers, or other processor based systems. A conventional signature watchdog is configured to generate a sequence of requests to the processor, to receive a response from the processing circuit, and to compare the response with an expected response. The watchdog may reset the signal processing circuit when the received response does not match the expected response.

SUMMARY OF THE INVENTION

A first embodiment relates to a method of monitoring a processing circuit. The method includes having the processing circuit to generate a response to a request, comparing the response with an expected response, generating a pass pulse each time a response matches an expected response, and evaluating a frequency at which pass pulses occur.

A second embodiment relates to a monitoring arrangement for monitoring a processing circuit, the monitoring arrangement includes a first monitoring circuit, and the first monitoring circuit is configured to have the processing circuit to generate a response to a request, to compare the response with an expected response, to generate a pass pulse each time a response matches an expected response, and to evaluate a frequency at which pass pulses occur.

A third embodiment relates to a circuit arrangement. The circuit arrangement includes a processing circuit, and a monitoring arrangement with a first monitoring circuit. The first monitoring circuit is configured to have the processing circuit to generate a response to a request, to compare the response with an expected response, to generate a pass pulse each time a response matches an expected response, and to evaluate a frequency at which pass pulses occur.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In the following Detailed Description, reference is made to the accompanying drawings, which form a part thereof, and in which is shown by way of illustration specific embodiments in which the invention may be practiced.

Figure 1:
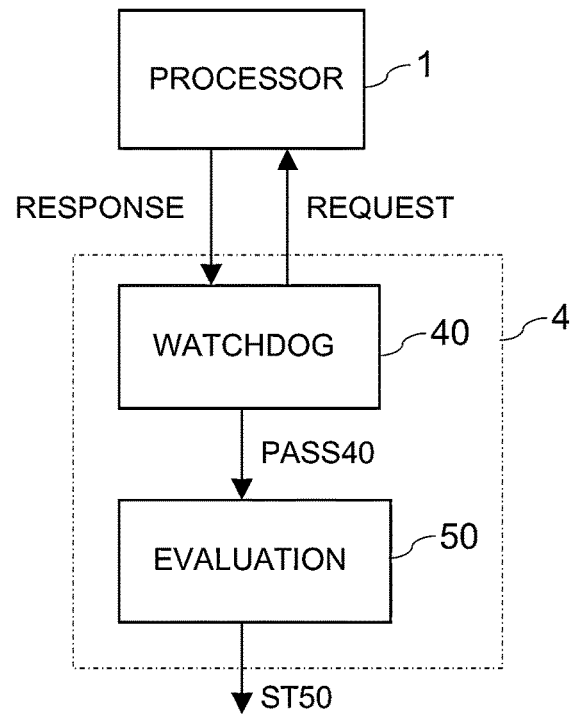
FIG. 1 illustrates a circuit arrangement with a monitoring circuit that includes a watchdog device and an evaluation unit.

FIG. 1 schematically illustrates a circuit arrangement with a processor 1 and a monitoring circuit 4. The processor 1 may be a conventional processor, such as a digital signal processor (DSP), a microcontroller, or any other type of processor based system. According to one embodiment, the processor is implemented in a safety-critical industrial or automotive system such as, e.g., a passenger protection system (restrain system, ABS, etc.) in an automobile.

A signal communication path between the processing circuit 1 and the monitoring circuit 4 is only schematically illustrated in FIG. 1. According to one embodiment, two dedicated signal lines are provided, a first signal line for transmitting the request from the watchdog device 40 to the processor 1, and a second signal line for receiving the response from the processor 1. According to a further embodiment, the signal communication path includes only one signal line that can be used for a bidirectional signal communication. According to a further embodiment, the signal communication path includes a signal bus.

The monitoring circuit 4 serves to monitor the operation of the processor 1, so as to be able to detect failures in the operation of the processor 1. In particular, in safety-critical systems, monitoring the processor is of utmost relevance.

The monitoring circuit 4 includes a watchdog 40, in particular a signature watchdog. The watchdog 40 provides for a functionality test of the processor and is configured to send a sequence of requests to the processor 1. When the processor 1 works properly it returns a response to the watchdog 40 each time after it receives a request from the watchdog 40. Like a conventional watchdog, watchdog 40 is configured to receive the response, and to compare the response with an expected response. The watchdog 40 may be configured to send different requests in order to check (monitor) different functions of the processor 1. In this case, the processor may return different responses, namely dependent on the received requests. Thus, the expected response may vary dependent on the request that has been sent.

Unlike a conventional watchdog, watchdog 40 sends a pass signal (pass pulse) to an evaluation unit each time a response received from the processor 1 matches the expected response. The evaluation unit 50 is configured to evaluate a frequency at which signal pulses are received from the watchdog device 40. This may include to evaluate a number of pass signals received within a predefined time frame, or any other type of method that is suitable to obtain an information on a (mean) frequency in a predefined time frame. The evaluation unit is further configured to provide a status information (status signal) ST50 based on the evaluation. The status information ST50 may be evaluated by further circuitry (not illustrated in FIG. 1) that is operable to take suitable measures such as, e.g., resetting the processor 1, sending an alert information to an operator, or the like. According to one embodiment, the status information ST50 is represented by a signal that assumes one of two signal levels, namely a normal operation level and a failure level. The evaluation unit 50 may be configured to generate a failure level when a number of pass pulses received within the predefined time frame is less than a threshold and/or when a (mean) frequency of pass signals in a certain time frame is less than a frequency threshold, such as zero.

Figure 2:
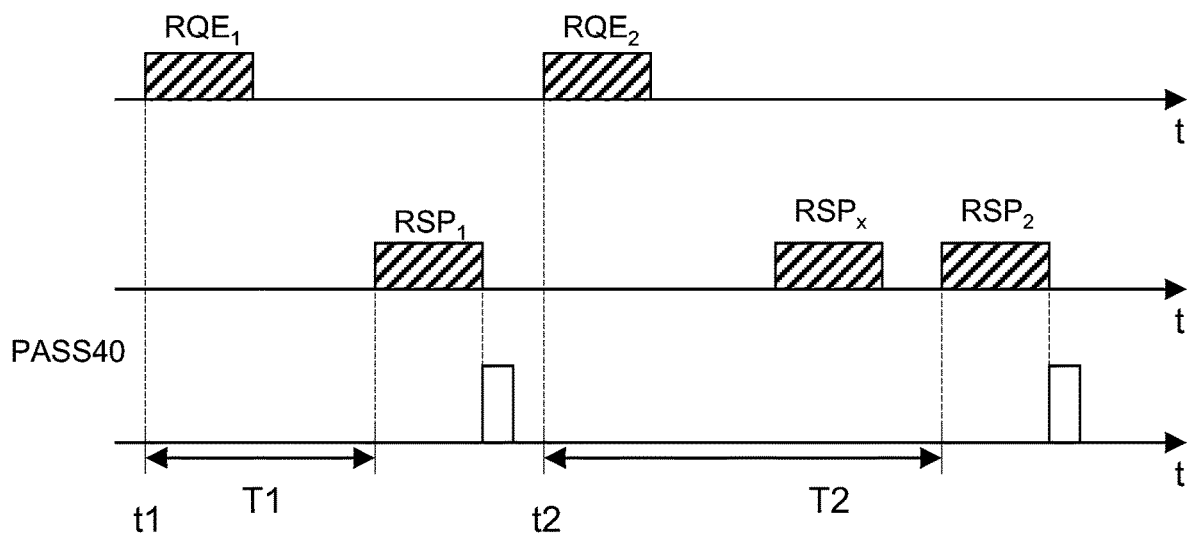
FIG. 2 shows timing diagrams illustrating the operating principle of the watchdog device.

FIG. 2 shows timing diagrams illustrating a sequence of requests transmitted to the processor 1, a sequence of responses $RSP_1$, $RSP_x$, $RSP_2$, received by the watchdog 40 from the processor 1, and a pass signal PASS40 with a sequence of pass pulses. The watchdog 40 may be configured to send different types of requests to the processor 1. These different types of requests may include requests to the processor 1 to return the content of certain registers in the processor 1, requests to perform mathematical or logical operations, or requests to return a signal with a specific signal waveform. Each of these requests have a corresponding expected response, which is the response the watchdog 40 expects to receive from the processor 1 in response to a specific request. In FIG. 2, requests and responses are only schematically illustrated in the timing diagrams.

After the watchdog 40 has sent a request to the processor 1, different scenarios may occur. A first scenario will be explained with reference to request $RQE_1$ and response $RSP_1$ in FIG. 2. For explanation purposes it is assumed that watchdog 40 sends a request $RQE_1$ at time t1 to the processor 1. Processor 1 processes the request and returns a response $RSP_1$. This response $RSP_1$ matches an expected response. In the following, "matching response" denotes a response that is received after a request has been sent to the processor 1 and that matches an expected response associated with the request.

Since the received response $RSP_1$ is a matching response, watchdog 40 sends a pass pulse to the evaluation unit 50. The pass pulse is sent after the response $RSP_1$ has been received and after the watchdog 40 has verified that the response $RSP_1$ is a matching response. There may be a time delay between the end of the response $RSP_1$ and the time when the pass pulse is sent. This time delay (which is not illustrated in FIG. 2) may be dependent on the time it takes for the watchdog 40 to process the response $RSP_1$. A time period T1 between the time t1 when the watchdog 40 starts to send the request $RQE_1$ and the time when the response $RSP_1$ is received is irrelevant for processing the response in the watchdog 40 and may be dependent on different parameters, such as workload of the processor 1, the complexity of the request, and the like.

Referring to FIG. 2, the watchdog 40 generates a next request $RQE_2$ after a response $RSP_1$ corresponding to the previous request $RQE_1$ has been received. There may be a time delay between the end of the matching response $RSP_1$ and the generation of the next request $RQE_2$.

In the embodiment of FIG. 2, t2 is a time when a next request $RQE_2$ is transmitted from the watchdog 40 sends to the processor 1. The watchdog 20 may actively send the request to the processor 1, or the watchdog 20 may provide the request, e.g., in a register, to be fetched by the processor. When request $RQE_2$ has been sent, the watchdog 40 receives a response $RSP_x$ from the processor 1. However, this response $RSP_x$ is not a matching response (does not match an expected response) so that the watchdog 40 does not generate a new request and keeps waiting for the matching response. In the embodiment of FIG. 2 the matching response $RSP_2$ is received after the non-matching response $RSP_x$. After the matching response $RSP_2$ has been received, a pass pulse is generated and the watchdog 40 generates a new request.

As can be seen from FIG. 2, there is no synchronization between the watchdog 40 and the processor 1. The watchdog 40 transmits a new request to the processor 1 each time after a matching response to the previous request has been received. After a request has been sent, the watchdog 40 waits until the matching response is received. There is no timeout generated in the watchdog 40 itself. That is, the watchdog 40 is kept in a waiting state waiting for a matching response until the matching response is received or until the watchdog is reset. This will be explained in the further detail herein below.

Figure 3:
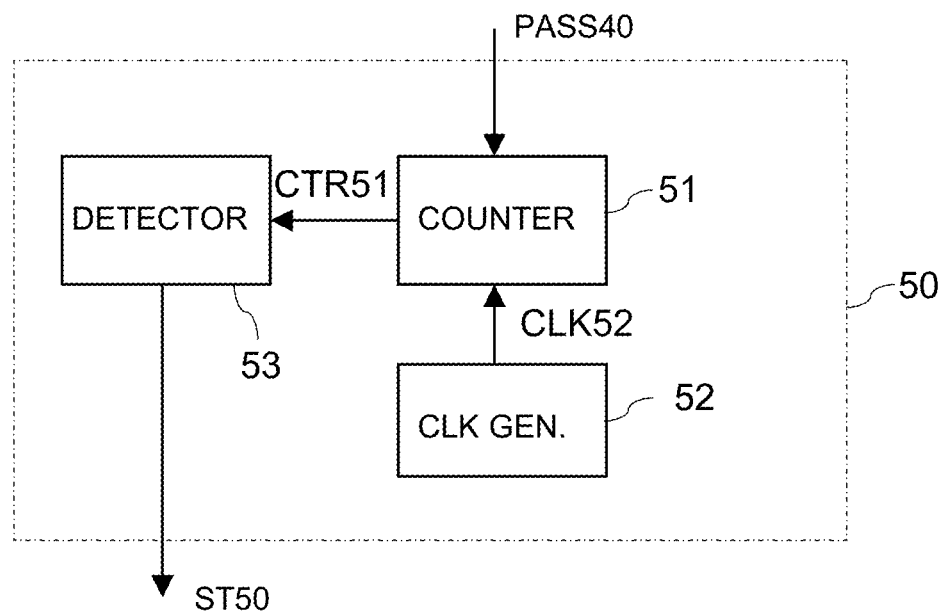
FIG. 3 shows a block diagram of the evaluation unit according to a first embodiment.

FIG. 3 shows a block diagram of an evaluation unit 50 according to an embodiment. The evaluation unit 50 according to this embodiment includes a counter 51 with an incrementing input and a decrementing input. The counter 51 receives the pass signal from the watchdog 40 (not illustrated in FIG. 3) at one of the incrementing and the decrementing inputs, and receives a clock signal CLK52 from a clock generator 52 at the other one of the incrementing and the decrementing inputs.

The counter 51 is one of incremented and decremented by the pass pulses in the pass signal PASS40 and is the other one of incremented and decremented by the clock signal CLK52 generated by the clock generator 52. Just for explanation purposes it is assumed that the pass pulses increment the counter 51, while the clock signal CLK52 decrements the counter 51 with every clock pulse.

Referring to FIG. 3, a counter reading CTR51 of the counter 51 is received by a detector 53. The detector 53 is configured to compare the counter reading CTR51 with a threshold and to generate the status signal ST50 dependent on this detection. The operating principle of the evaluation unit 50 of FIG. 3 is be explained with reference to FIG. 4.

Figure 4:
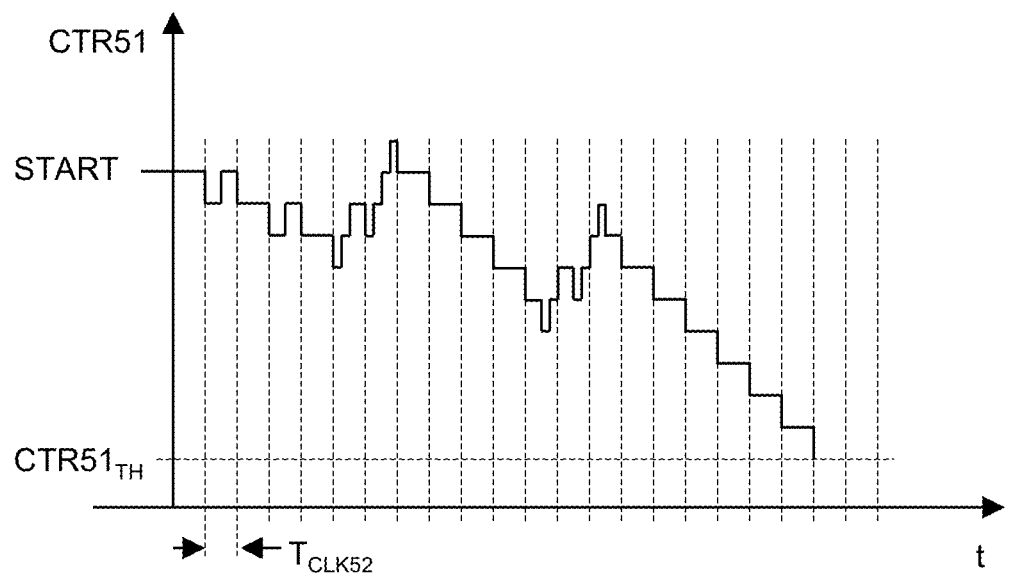
FIG. 4 shows a timing diagram illustrating the operating principle of the evaluation unit of FIG. 3.

FIG. 4 shows an exemplary timing diagram of the counter reading CTR51 over time t. For explanation purposes it is assumed that the counter 51 has a start value START at the time the evaluation circuit 60 starts to operate. $T_{CLK52}$ in FIG. 4 denotes the time period of one cycle of the clock signal CLK52, with $f_{CLK52}=1/T_{CLK52}$, where $f_{CLK52}$ is the frequency on the clock signal CLK52. Referring to FIG. 4, the counter 51 is decremented once in every clock cycle of the clock signal CLK52. Further, the counter 51 is incremented each time a pass pulse of the pass signal PASS40 is received, which is each time a matching response is received. The pass pulses and the clock signal are not synchronized, so that there are time periods in which the counter 51 is incremented several times before the counter is again decremented, or there may be time periods in which the counter is decremented several times before it is again incremented. According to one embodiment, the start value START is a maximum counter reading of the counter 51. A frequency of the clock signal CLK52 is selected such that the frequency is lower than a mean frequency of the pass pulses in the normal operation mode of the processing circuit 1. The normal operation mode of the processing circuit 1 is an operation mode in which the processing circuit 1 correctly responds to request of the watchdog device 40. Thus, in the normal operation mode, the counter reading CTR51 cannot be decremented to a threshold CTR51$_{TH}$, that is below the start value START. When, however, a failure occurs in the processing circuit 1 such that the processing circuit 1 stops to respond to requests of the watchdog device 40 or returns non-matching responses so that no pass pulses of the pass signal PASS40 are generated, the counter 51 is only decremented by the clock signal CLK52 until the counter reading CTR51 reaches the threshold CTR51$_{TH}$.

In an embodiment in which the pass signal PASS40 decrements the counter 51 and the clock signal CLK52 increments the counter 51, a threshold value would be higher than the start value START. According to a further embodiment, there are two threshold values defining a window for the counter reading CTR51. The start value START is between these two threshold values in this embodiment.

The status signal ST50 is generated by the detector 53 dependent on whether the counter reading CTR51 has reached the threshold value (or one of the two threshold values). According to one embodiment, the status signal ST50 assumes one of two different signal levels, namely a normal operation level or a failure level, where the detector 53 generates the status signal ST50 such that it assumes the failure level when the counter reading CTR51 reaches the threshold value (or one of the two threshold values).

Figure 5:
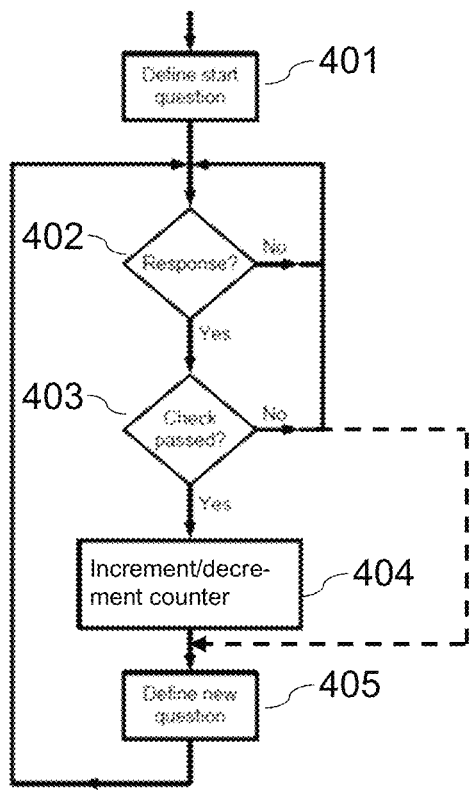
FIG. 5 shows a sequence of method steps illustrating the operating principle of a monitoring circuit with an evaluation unit according to FIG. 3.
Figure 6:
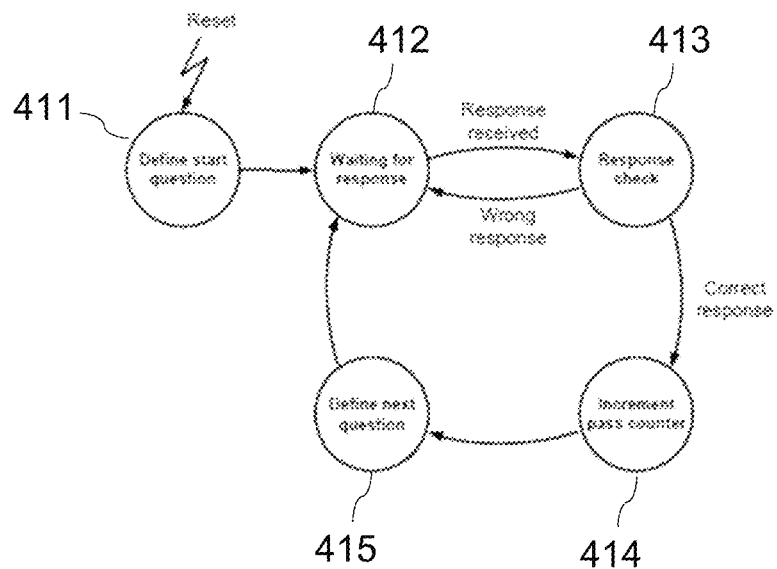
FIG. 6 shows a state diagram illustrating the operating principle of a monitoring circuit including an evaluation unit of FIG. 3.

The operating principle of a monitoring circuit including an evaluation 50 as illustrated in FIG. 3 will further be explained with reference to FIGS. 5 and 6 below in which FIG. 5 illustrates method steps of a method performed by the monitoring circuit 2, and FIG. 6 illustrates a state diagram of the monitoring circuit 2.

Referring to FIG. 5, in a first method step 401 the monitoring circuit 2 defines a start question (start request) and transmits this request to the processor 1. The monitoring circuit 2 then waits for a response from the processor 1 (step 402). When a response is received, the response is evaluated (step 403) in order to check if the received response is a matching response. If the received response is not a matching response, the monitoring circuit 2 returns to step 402. If the received response is a matching response, the counter 51 is incremented or decremented (step 404). After incrementing/decrementing the counter, a new question is defined (step 405) and transmitted to the processor 1, and the monitoring circuit 2 again waits for a response from the processor 1 (step 402).

The method of FIG. 5 may continue until the status signal (ST50 in FIG. 4) indicates that a failure has occurred. At this time, the processor 1 and/or the monitoring circuit 2 may be stopped or reset. Resetting the monitoring circuit 2 may include setting the counter reading CTR51 of the counter 51 to the start value START.

In an alternative embodiment (illustrated in dashed lines in FIG. 5), the monitoring circuit 2, upon receipt of a non-matching response, does not return to waiting state 402, but proceeds to step 405 in which a new question is defined.

FIG. 6 illustrates the operating principle of the monitoring circuit 2 by way of a state diagram. Referring to FIG. 6, the monitoring circuit 2 is in a first state 411 in which a start question is defined and transmitted to the processor 1 after the monitoring circuit 2 has been reset. Having sent the start question, the monitoring circuit 2 changes to a waiting state 412 in which the monitoring circuit 2 waits for a response from the processor 1. When a response is received, the monitoring circuit 2 checks if the response is a matching response (state 413) and returns to the first waiting state 412 when the received response is not a matching response. When the received response is a matching response, the monitoring circuit 2 changes to a state 414 in which the counter 51 is incremented or decremented. After the counter has been incremented or decremented a new question is defined in state 415, where the monitoring circuit 2 changes to the waiting state 412 after the request has been sent to the processor 1.

Implementing the evaluation unit 50 with a counter 51 as illustrated in FIG. 3 is only an example. In general, the evaluation unit 50 is configured to evaluate a frequency at which signal pulses (pass pulses) of the pass signal PASS40 are generated, and to generate the status signal ST50 based on the evaluation. According to further embodiments, the evaluation unit 50 is configured to assert the status signal ST50 (to generate a failure level of the status signal ST50) when a mean frequency of the pass pulses as determined in a predefined time period is less than a predefined frequency value and/or when there is a predefined time period in which no pass pulses are received.

According to a further embodiment, the evaluation unit 50 is configured to determine a frequency spectrum of the status signal ST, using, e.g., an FFT (Fast Fourier Transform), to evaluate the spectrum and to assert the alert signal when the spectrum meets specific criteria.

Figure 7:
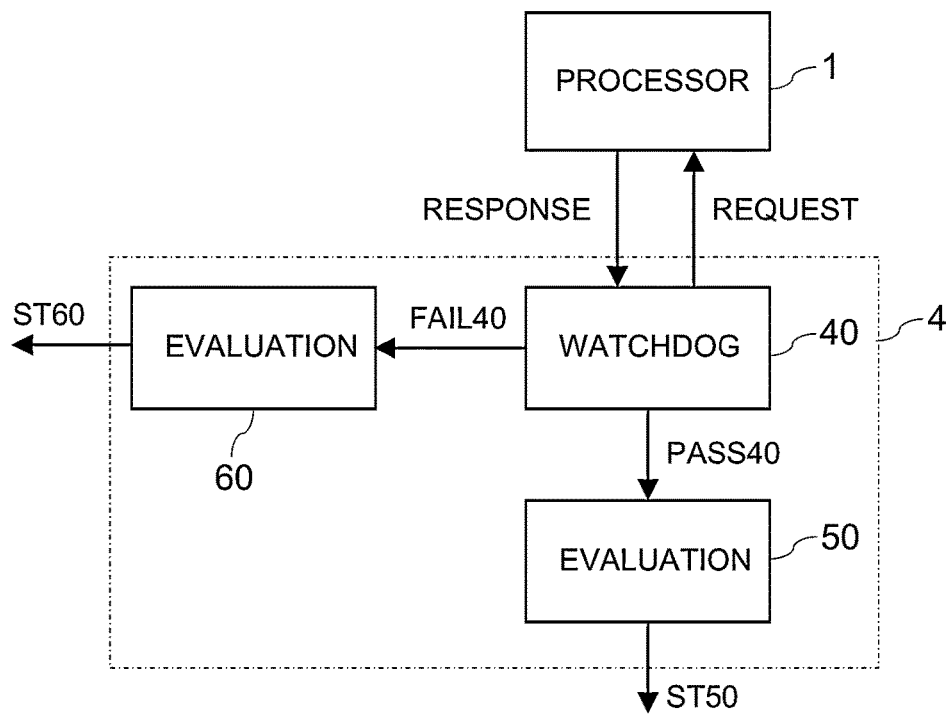
FIG. 7 illustrates a monitoring circuit with a watchdog device and with first and second evaluation units.

FIG. 7 shows a block diagram of a monitoring circuit 4 according to a further embodiment. In this embodiment, the monitoring circuit 4 includes a further evaluation unit 60 that receives a fail signal FAIL40 from the watchdog device 40 and that generates a further status signal ST60 dependent on the fail signal FAIL40. The operating principle of the monitoring circuit 4 of FIG. 7 is explained with reference to FIG. 8 below.

Figure 8:
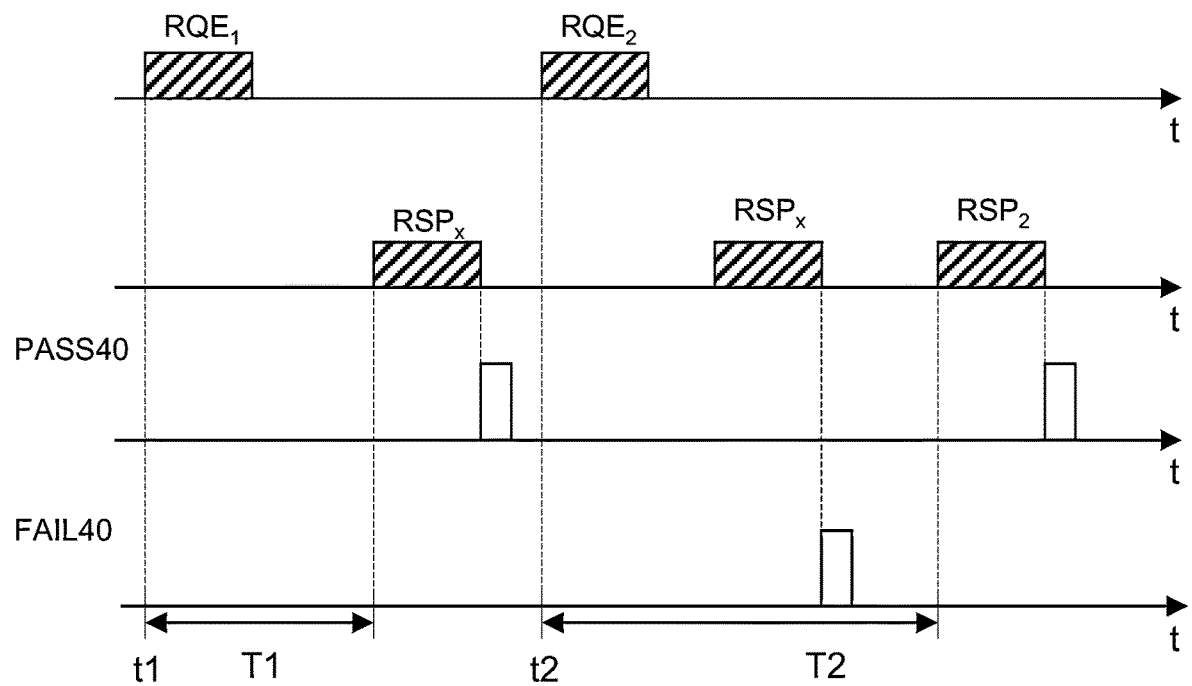
FIG. 8 shows timing diagrams illustrating the operating principle of the monitoring circuit of FIG. 7.

FIG. 8 shows timing diagrams of an exemplary sequence of requests, of an exemplary sequence of responses, of the pass signal PASS40, and of the fail signal FAIL40. As explained with reference to FIGS. 1 and 2, the watchdog device 40 generates a pass pulse each time, a matching request is received. The watchdog device 40 of FIG. 7 is further configured to generate a signal pulse of the fail signal FAIL40 each time a response is received that is not a matching response. In the embodiment illustrated in FIG. 8, a signal pulse of the fail signal FAIL40 is generated after the response RSP$_x$ (which is not a matching response) has been received.

The further evaluation unit 60 may include a simple counter that counts the signal pulses in the fail signal FAIL40 and that may be configured to generate a failure level of the status signal ST60 when a counter reading of this counter reaches a predefined threshold. Like the status signal ST50 provided by the evaluation unit 50, the further status signal ST60 provided by the further evaluation unit 60 may be used to reset the processor 1, the monitoring circuit 4 or may be any other type of alert signal. According to one embodiment, the measures that are taken when one of the status signals ST50, ST60 assumes a failure level are identical. According to a further embodiment, different measures are taken dependent on whether the status signal ST50 or the status signal ST60 assumes a failure level. According to one embodiment, a failure level of the second status signal ST60 may (permanently) power down the processing circuit 1, while a failure level of the first status signal ST50 may reset the processing circuit 1.

Figure 9:
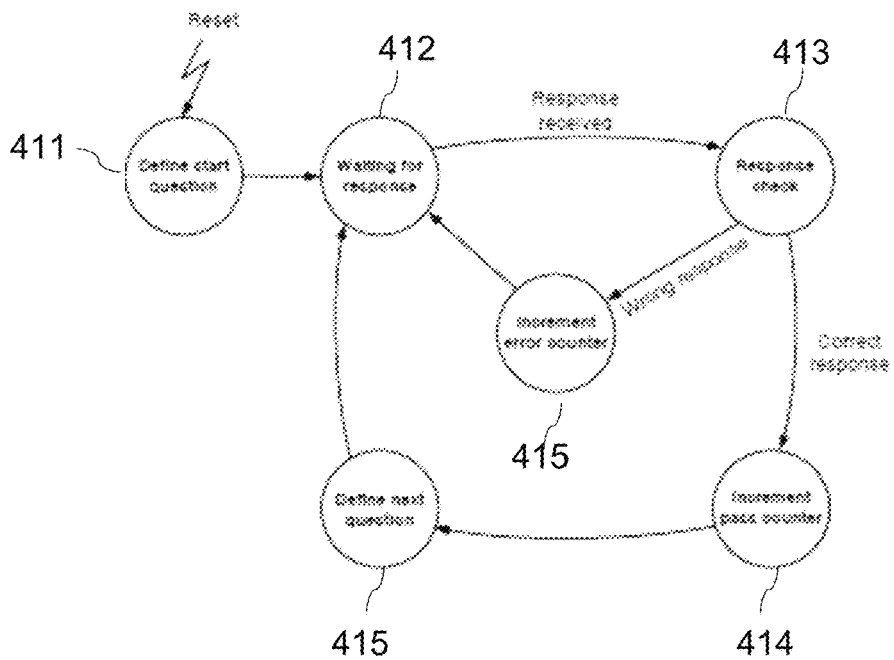
FIG. 9 shows a state diagram illustrating the operating principle of the monitoring circuit of FIG. 7.

FIG. 9 illustrates a state diagram of a monitoring circuit 4 of FIG. 7. The state diagram corresponds to the state diagram of FIG. 6 and includes one additional state 415. In this state 415 a counter in the further evaluation unit 60 is incremented each time a non-matching response (wrong response) is received. Alternatively, the counter may be decremented each time the non-matching response is received. From state 415 the monitoring circuit 4 changes to the waiting state 412.

Figure 10:
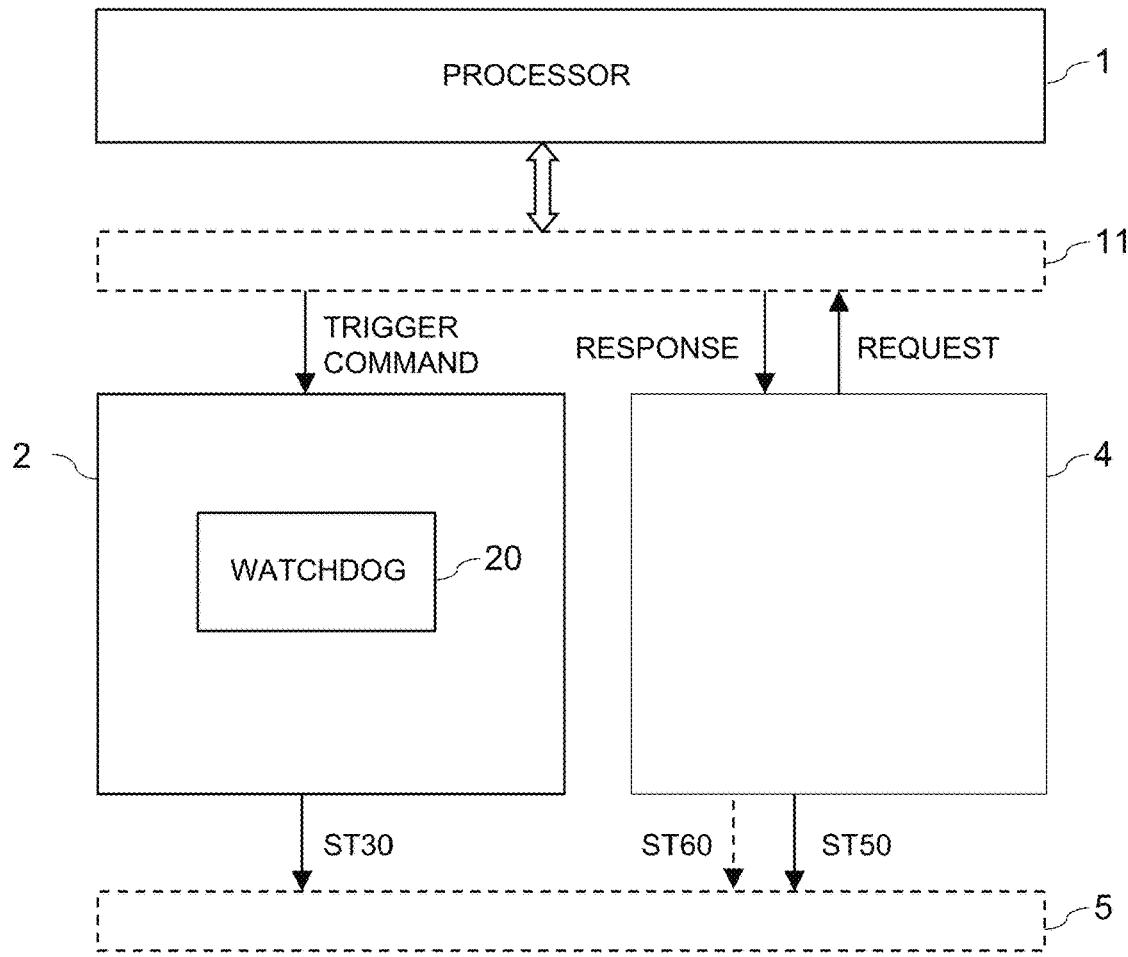
FIG. 10 illustrates a circuit arrangement with, a first monitoring circuit including a signature watchdog device, and a second monitoring circuit including a window watchdog device.

FIG. 10 shows a block diagram of a circuit arrangement according to a further embodiment. The circuit arrangement of FIG. 10 includes the processing unit 1 and a first monitoring circuit 4 that may correspond to one of the monitoring circuits 4 explained herein before. This first monitoring circuit 4 includes a signature watchdog and is operable to send requests to the processor 1 and to receive responses from the processor 1. The first monitoring circuit 4 generates at least one status signal ST50 and may generate two status signals, namely signals ST50 explained herein before and the further status signal ST60 explained herein before. According to one embodiment, the at least one status signal ST50, ST60 is received by an alert circuit 5 that is operable to take suitable measures, such as resetting the processor 1 and the monitoring circuit 4, when one of the status signals ST50, ST60 indicates that a failure has occurred (which is when one of these signals has a failure level). Optionally, the circuit arrangement includes an interface circuit 11 between the processor 1 and the first monitoring circuit 4. This interface circuit 11 may handle the signal communication between the processor 1 and the first monitoring circuit 4.

Referring to FIG. 10, the circuit arrangement additionally to the first monitoring circuit 4 includes a second monitoring circuit 2 that is in signal communication with the processing unit 1. This signal communication may be handled through the interface circuit 11. The second monitoring circuit 2 includes a watchdog 20 configured to monitor a timing of the processor. The watchdog 20 may be implemented as a low level watchdog or as a window watchdog. For explanation purposes it is assumed that watchdog 20 is a window watchdog that is configured to receive a sequence of trigger commands from the processor 1 and that is configured to detect if individual trigger commands meet specific timing requirements such that the individual trigger commands are received in a certain in time period, referred to as open window period. The basic operating principle of the second monitoring circuit 2 is explained with reference to FIG. 11 below. In an alternative embodiment (not shown), the circuit arrangement only includes the second monitoring circuit 4, while the first monitoring circuit 2 is omitted.

Trigger commands or responses provided by the processor are digital data sequences that may include an address indicating the desired recipient. The interface circuit 11 may be configured to identify the address and to forward the digital data sequence to the first or the second monitoring circuit 2, 4 or even to both monitoring circuits 2, 4. The latter is explained with reference to FIG. 20 below.

Figure 11:
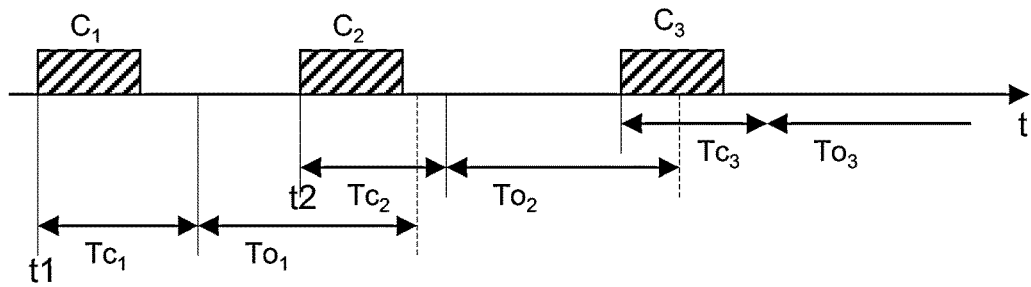
FIG. 11 shows a timing diagram illustrating the basic operating principle of a window watchdog device according to a first embodiment.

FIG. 11 shows a timing diagram illustrating a sequence of trigger commands as received by the window watchdog 20. FIG. 11 schematically illustrates three trigger commands $C_1$, $C_2$, $C_3$ that are received by the watchdog 20 at different times (time instances) t1, t2, t3. As one trigger command is received by the watchdog 20, a sequence with a closed window period and with an open window period subsequent to the closed window period starts. E.g., when a first trigger command $C_1$ is received, a sequence with a first closed window period and with a first open window period starts. In FIG. 2, $Tc_1$ denotes the duration of the closed window period, and $To_1$ denotes the duration of the open window period.

In the following, the wording "window sequence" denotes a sequence with a closed window period and a subsequent open window period. A window sequence that starts when a trigger command is received, will be referred to as window sequence triggered by that trigger command. Further, just for explanation purposes it is assumed that the time when the trigger command is received is the time when the trigger command starts. However, this is only an example. The time when the trigger command is received could also be the time at the end of the trigger command or somewhere in the middle of the command. A window sequence starts each time a trigger command is received, independent of whether the trigger command is received in an open window period or in a closed window period.

According to one embodiment, the durations of the closed window periods are fixed and the duration of the open window periods are fixed. That is, $Tc_1=Tc_2=Tc_3$ and $To_1=To_2=To_3$.

According to a further embodiment, the durations of at least one of the closed window periods and the open window periods are defined through the processor 1 using the trigger commands. There are different ways how this may be accomplished.

According to a first embodiment, the time information of at least one of the closed window period and the open window period of one window sequence is included in each trigger command that triggers the window sequence. E.g., in the embodiment of FIG. 11, a time information of at least one of the duration $Tc_1$ of the closed window period and the duration $To_1$ of the open window period in the window sequence triggered by the first trigger command is included in the first trigger command $C_1$, a time information of at least one of the duration $Tc_2$ of the closed window period and the duration $To_2$ of the open window period in the window sequence triggered by the trigger command $C_2$ is included in the second trigger command $C_2$, and a time information of at least one of the duration $Tc_3$ of the closed window period and the duration $To_3$ of the open window period in the window sequence triggered by the trigger command $C_3$ is included in the third trigger command $C_3$. Each trigger command may include only one time information, namely the time information one of the closed window period and the open window period triggered by the trigger command, or may include time information for both, the closed window period and the open window period.

According to a second embodiment, the processing circuit is configured to transmit two types of trigger commands, namely window-defining trigger commands and non-window-defining trigger commands. A window-defining trigger commands may include time information of one of the closed window period and the open window period (while the duration of the other one may be fixed) or may include time information of both, a closed window period and an open window period. Once the monitoring circuit 2 receives a window-defining trigger command the time information included in this trigger command is used to generate the window sequences until a new window-defining trigger command is received. For illustration purposes it is assumed that in the sequence of FIG. 11 the first trigger command $C_1$ is a window-defining trigger command, while the other trigger commands $C_2$, $C_3$ is a non-window defining trigger command. In this case, $Tc_1=Tc_2=Tc_3$ and $To_1=To_2=To_3$, where at least one of the durations of the closed window period and the open window period are defined by the first trigger command $C_1$.

In the following, $C_i$ denotes one of the trigger commands $C_1$-$C_3$ when reference to a specific one of these trigger commands is not required.

Figure 12:
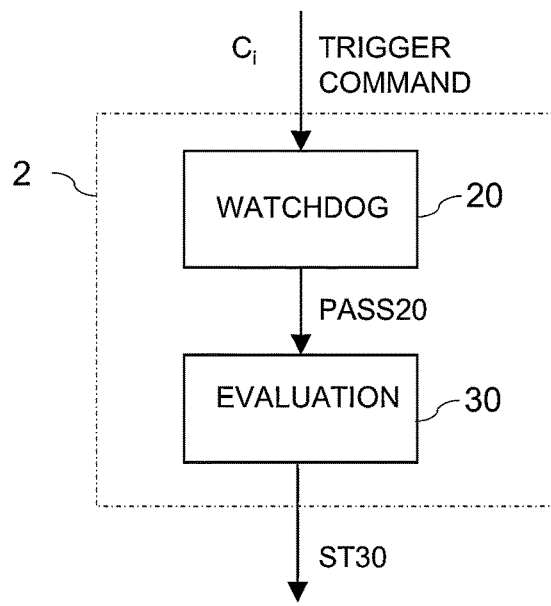
FIG. 12 illustrates one embodiment of the second monitoring circuit.

FIG. 12 shows a block diagram of the second monitoring circuit 2 according to a first embodiment. The monitoring circuit of FIG. 12 includes the watchdog device 20 that receives the sequence of trigger commands $C_i$ from the processing unit 1 and an evaluation unit 30 that receives a pass signal PASS20 from the watchdog device 20. According to one embodiment, the watchdog device 20 is configured to generate a signal pulse (pass pulse) of the pass signal each time a trigger command has been received in an open window period. The duration of this open window period may be defined in one of the ways explained before. The pass signal PASS20 is received by an evaluation unit 30 that is configured to generate a status signal ST30 dependent on the pass signal ST30. The status signal may assume one of two different signal levels, a failure level indicating that a failure has occurred, or a normal operation level indicating a normal operation of the processing circuit 1 and/or the monitoring circuit 2.

Figure 13:
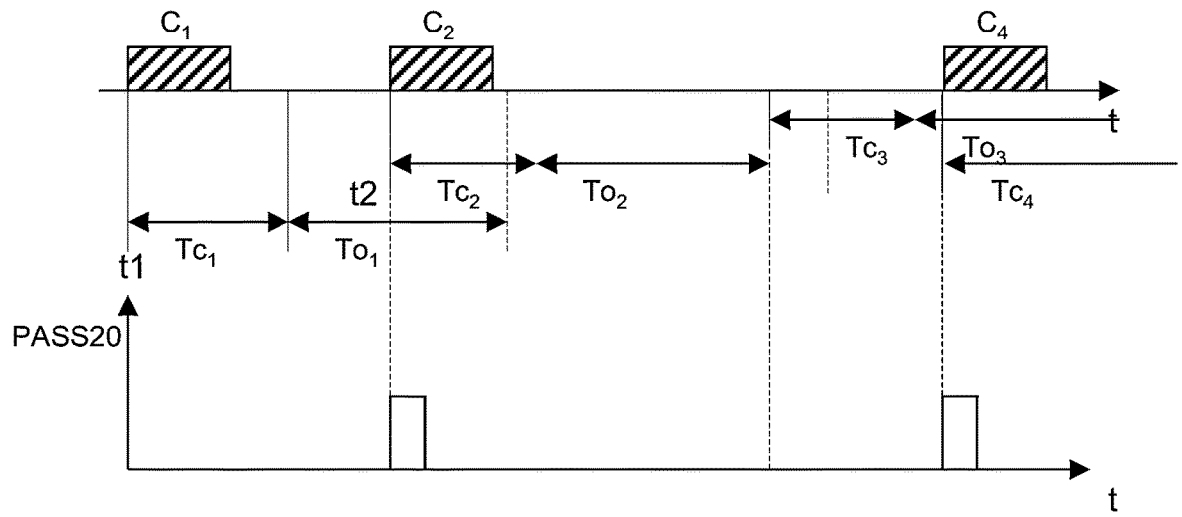
FIG. 13 shows timing diagrams illustrating the operating principle of the monitoring circuit of FIG. 12.

FIG. 13 shows timing diagrams of an exemplary sequence of trigger commands and the corresponding pass signal PASS20. FIG. 13 shows a sequence with three trigger commands that may be window-defining or non-window defining trigger commands. Referring to FIG. 13, the watchdog 20 is configured to generate a signal pulse of the pass signal PASS20 and to start an new window sequence each time a trigger command is received in an open window period, and is configured to start a new window sequence when an open window period elapses without receipt of a trigger command. The latter is illustrated at the end of open window period $To_2$ in which no trigger command is received. At the end of $To_2$ a new window sequence with a closed window period $Tc_3$ and an open window period $To_3$ is generated based on the time information in the latest received window-defining trigger command and/or based on fixed time information.

Figure 14:
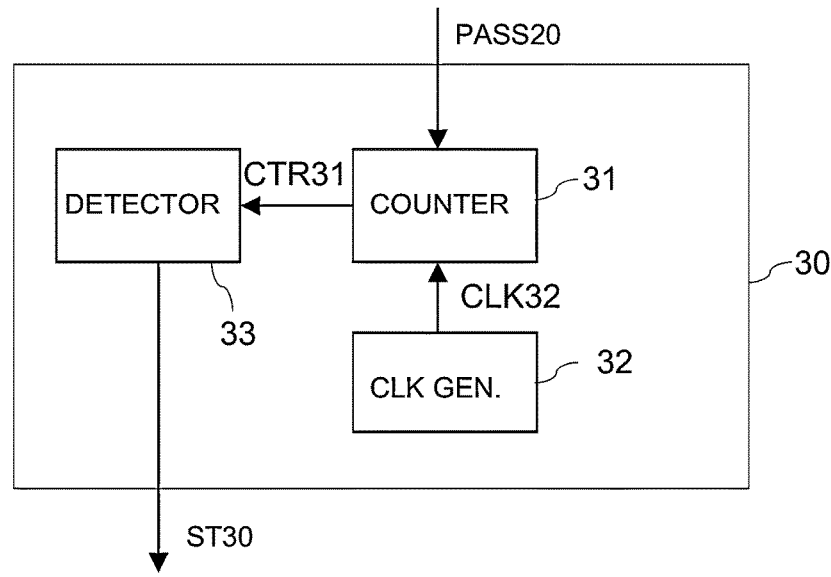
FIG. 14 illustrates a embodiment of a evaluation unit of the monitoring circuit of FIG. 12.

FIG. 14 illustrates one embodiment of the evaluation unit 30 in the second monitoring circuit 2 of FIG. 12. This evaluation unit 14 is implemented similar as the evaluation unit 50 of FIG. 3 and includes a counter 31 with an incrementing input and a decrementing input. The counter 31 receives the pass signal PASS20 from the watchdog 20 (not illustrated in FIG. 14) at one of the incrementing and the decrementing inputs, and receives a clock signal CLK32 from a clock generator 32 at the other one of the incrementing and the decrementing inputs.

The counter 31 is one of incremented and decremented by the pass pulses in the pass signal PASS20 and is the other one of incremented and decremented by the clock signal CK32 generated by the clock generator 32. Just for explanation purposes it is assumed that the pass pulses increment the counter 31, while the clock signal CK32 decrements the counter 51 with every clock pulse.

Referring to FIG. 14, a counter reading CTR31 of the counter 31 is received by a detector 33. The detector 33 is configured to compare the counter reading CTR31 with a threshold and to generate the status signal ST50 dependent on this detection. The operating principle of the evaluation unit 50 of FIG. 14 corresponds to the operating principle of the evaluation unit 30 of FIG. 3 explained with reference to FIG. 5 before. When a failure occurs such that no pass pulses are received for a certain time period the counter is only increased or decreased through the clock signal CLK32 until the counter reading CTR31 reaches one threshold. The detector 33 detects when the counter reading CTR31 reaches the threshold and generates a failure level of the status signal ST30.

Implementing the evaluation unit 30 with a counter 31 as illustrated in FIG. 14 is only an example. In general, the evaluation unit 30 is configured to evaluate a frequency at which signal pulses (pass pulses) of the pass signal PASS20 are generated, and to generate the status signal ST30 based on the evaluation. According to further embodiments, the evaluation unit 30 is configured to assert the status signal ST30 (to generate a failure level of the status signal ST30) when a mean frequency of the pass pulses as determined in a predefined time period is less than a predefined frequency value and/or when there is a predefined time period in which no pass pulses are received.

According to a further embodiment, the evaluation unit 30 is configured to determine a frequency spectrum of the status signal ST, using, e.g., an FFT (Fast Fourier Transform), to evaluate the spectrum and to assert the alert signal when the spectrum meets specific criteria.

Figure 15:
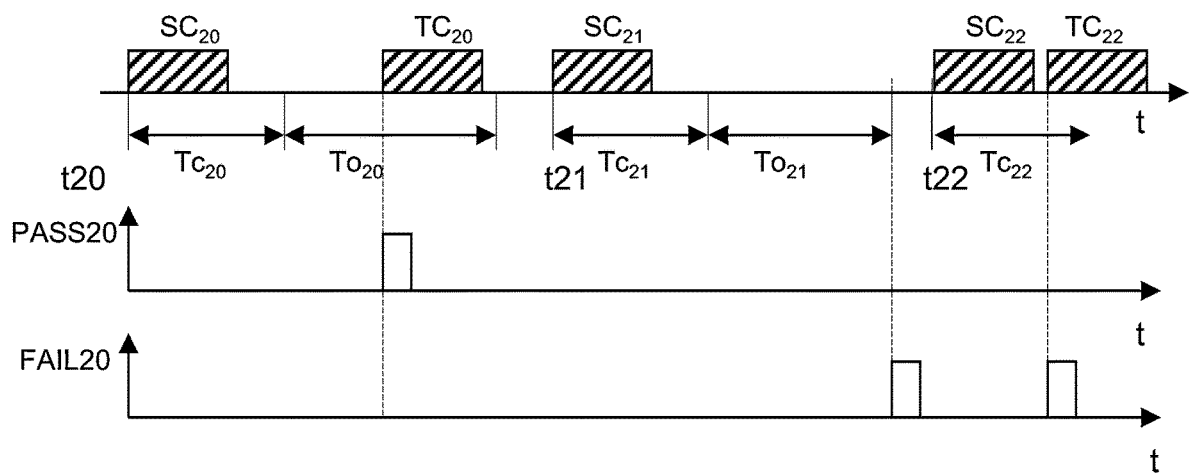
FIGS. 15 to 17 illustrate the operating principle of a monitoring circuit with a watchdog device according to a further embodiment.

FIG. 15 shows timing diagrams illustrating the operating principle of a watchdog device 20 according to a further embodiment. FIG. 15 illustrates an exemplary sequence of trigger commands received by the watchdog device 20 and of the pass signal PASS20 generated by the watchdog device. According to the operating principle illustrated in FIG. 15 the watchdog 20 is configured to receive two different types of trigger commands from the processing circuit 1, namely a window-defining trigger command and a non-window defining trigger command. In the following, the window-defining trigger command will also be referred to as "start command", while the non-window-defining rigger command will simply be referred to as "trigger command". The start command includes at least one time information that defines at least one of a closed window period and an open window period of a window sequence. Each time, the watchdog 20 receives a start command one window sequence with a closed window period and an open window period as defined by the at least one time information included in the start command starts. The watchdog then detects if a trigger command is received in the open window period.

In FIG. 15, t20 denotes a time at which a first start command $C_{20}$ is received. The start command $C_{20}$ defines at least one of a closed window period an open window period in a window sequence triggered by the start command $C_{20}$. Referring to FIG. 15, the watchdog 20 generates a signal pulse of the pass signal PASS20 each time a trigger command is received in the open window period defined by one start command. In FIG. 15, $Tc_{20}$ denotes the closed window period and $To_{20}$ denotes the open window period as defined by the start command $C_{20}$. A first trigger command $C_{20}'$ is received in the open window period, so that the pass signal PASS20 includes a signal pulse at the time the trigger command $C_{20}'$ is received. A pass pulse of the pass signal PASS20 is not generated when the watchdog receives a further start command in an open window as defined by a previous start command.

According to one embodiment, the watchdog 20, besides the pass signal PASS20, generates a fail signal FAIL20 that indicates when a failure has occurred. A failure could be that no trigger command is received within an open window period, or that a trigger command is received in a closed window period. In FIG. 15, $C_{21}$ denotes a further start command that defines a window sequence with a closed window period $Tc_{21}$ and an open window period $To_{21}$. In this open window period $To_{21}$ no trigger command is received, so that the fail signal FAIL20 includes a signal pulse at the end of this open window period $To_{21}$. $C_{22}$ in FIG. 15 denotes a further start command. In FIG. 15, a trigger $C22'$ is received in the closed window period $Tc_{22}$ as defined by the start command $C_{22}$. At this time, the fail signal FAIL20 also includes a signal pulse in order to indicate that a failure has occurred. A signal pulse of the fail signal FAIL20 is also generated when the watchdog receives a further start command in an open window as defined by a previous start command.

The operating principle of a monitoring circuit 2 with a watchdog device 20 that is configured to generate only one window sequence after a window-defining trigger command has been received will be further explained with reference to FIGS. 16 and 17 that illustrate method steps of a method performed in the monitoring circuit 2, and a state diagram, respectively.

Figure 16:
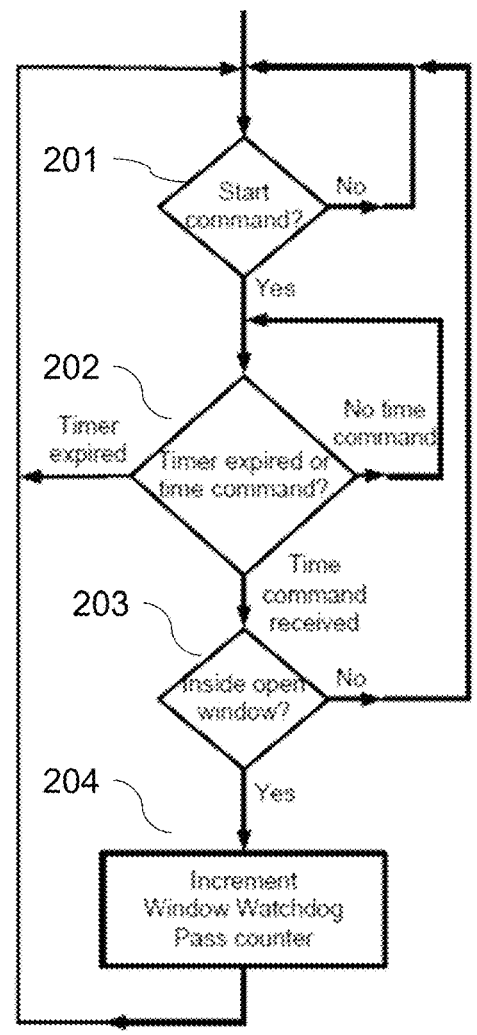

FIG. 16 shows a sequence of process steps illustrating the operating principle of one embodiment of the monitoring circuit of FIG. 12. Referring to FIG. 16, the monitoring circuit 2 waits for a start command in process step 201 and starts a window sequence when a start command is received. After a start command has been received, the monitoring circuit 2 then waits for a trigger command (time command) and, when a trigger command has been received, detects if the trigger command has been received in an open window (step 203). When the trigger command has been received in an open window, the monitoring circuit 2 sends a pulse of the pass signal PASS20 that increments or decrements the counter 31. In the embodiment illustrated in FIG. 16, the counter is incremented each time a trigger command is received in an open window. When no trigger command has been received in an open window the monitoring circuit 2 returns to step 201 and waits for a new start command.

Figure 17:
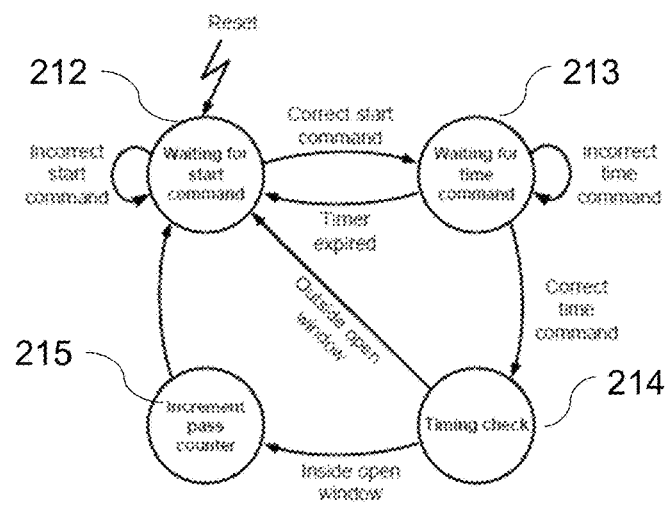

FIG. 17 illustrates the operating principle of one the monitoring circuit 2 by way of a state diagram. After reset, monitoring circuit 2 is in a first waiting state 212 and waits for a start command. When the start command has been received, the system changes to a second waiting state 213 in which the system waits for a trigger command (time command). The system stays in this second waiting state 213 until a correct trigger command is received or until the open window period elapses (or a timer defining the open window period elapses). When a trigger command is received, the monitoring circuit 2 checks in state 214 if the trigger command has been received in an open window. If the trigger command has been received in an open window, the system changes to state 215 in which the counter is incremented and then returns to the first waiting state 212. Otherwise, the system returns from timing check state 214 to the first waiting state 212.

Figure 18:
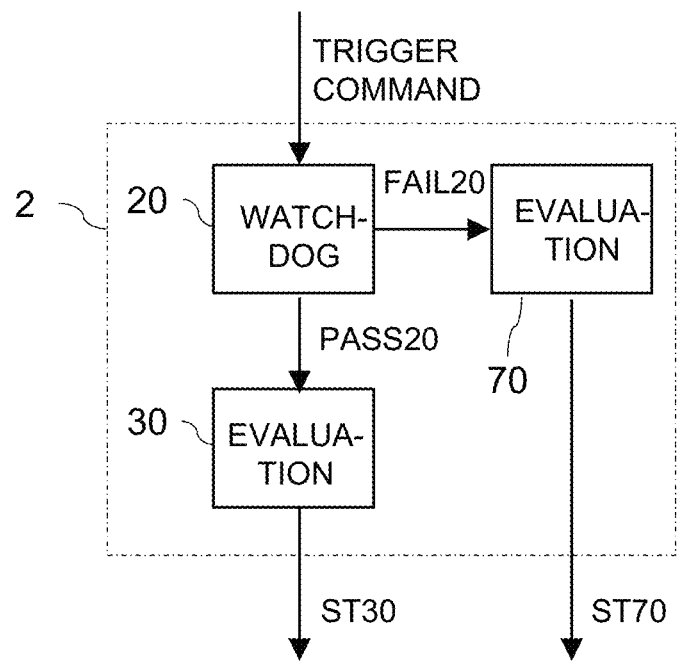
FIG. 18 shows a block diagram of a monitoring circuit with a window watchdog device according to a further embodiment.

FIG. 18 illustrates a further embodiment of a second monitoring circuit 2. In this embodiment, the watchdog 20 is configured to generate a fail signal FAIL20 as explained with reference to FIG. 15. A further evaluation unit 70 receives the fails signal FAIL20 and generates a further status signal dependent on the fail signal FAIL20. The further evaluation unit 70 may include a simple counter that counts the signal pulses in the fail signal FAIL20 and that may be configured to generate a failure level of the status signal ST70 when a counter reading of this counter reaches a predefined threshold. Like the status signal ST30 provided by the evaluation unit 30, the further status signal ST70 provided by the further evaluation unit 70 may be used to reset the processor 1, the monitoring circuit 4 or may be any other type of alert signal. According to one embodiment, the measures that are taken when one of the status signals ST30, ST70 assumes a failure level are identical. According to a further embodiment, different measures are taken dependent on whether the status signal ST30 or the status Signal ST70 assumes a failure level. According to one embodiment, a failure level of the second status signal ST70 may (permanently) power down the processing circuit 1, while a failure level of the first status signal ST30 may reset the processing circuit 1.

Figure 19:
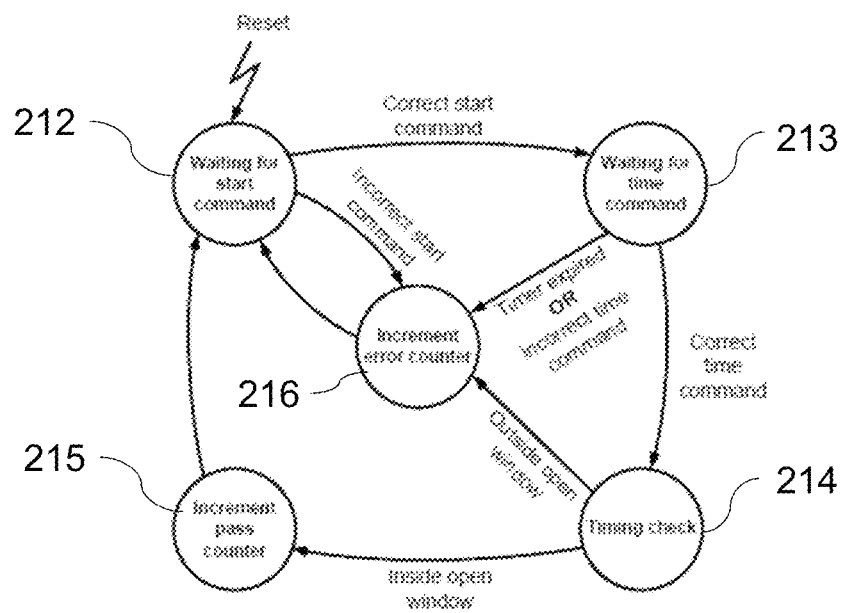
FIG. 19 shows a state diagram of the monitoring circuit of FIG. 18.

FIG. 19 shows a state diagram illustrating the operating principle of the monitoring circuit 2 of FIG. 18. The state diagram of FIG. 19 corresponds to the state diagram of FIG. 17 and includes one additional state 216. In this state 216 a counter in the further evaluation unit 70 is incremented each time a signal pulse of the fail signal FAIL20 is received. Alternatively, the counter may be decremented each time a signal pulse of the fail signal FAIL20 is received. From state 216 the monitoring circuit 2 changes to the waiting state 412.

Referring to the explanation above, there are different possible operation modes of the window watchdog 20, namely:

a) A first operation mode in which the watchdog 20 once receives a window-defining trigger command and in which the watchdog 20 generates a plurality of subsequent window sequences using the time information included in the window-defining trigger command until a next window-defining trigger command is received. In this operation mode, a new window sequence starts each time a trigger command (window-defining or non-window-defining) is received, or after an open window period has expired. A pass pulse is generated each time a trigger command is received in an open window period. Optionally, a fail pulse is generated each time a trigger command is received in a closed window period, and each time an open window period expires without having received a trigger command.

b) A second operation mode in which each of the trigger commands is a window-defining trigger command that includes time information for only one window sequence. In this operation mode, a window sequence starts each time a trigger command is received. A pass pulse is generated each time a trigger command is received in an open window as defined by a previous trigger command. Optionally, a fail pulse is generated Optionally, a fail pulse is generated each time a trigger command is received in a closed window period, and each time an open window period expires without having received a trigger command.

c) A third operation mode in which there are window-defining and non-window-defining trigger commands. When the watchdog 20 receives a window-defining trigger command it generates only one window sequence based on the time information included in the window-defining trigger command and waits to receive a non-window defining trigger command in the open window. A pass pulse is generated each time, a non-window-defining trigger command is received in an open window as defined by the previous window-defining trigger command. Optionally, a fail pulse is generated each time a trigger command is received in a closed window period, each time a window-defining trigger command is received in an open window period, and each time an open window period expires without having received any trigger command.

According to one embodiment, the watchdog 20 is configured to operate in only one of these operation modes. According to a further embodiment, the watchdog 20 is programmable to operate in one of these three operation modes. In this embodiment, the watchdog 20 is further configured to receive an operation mode command indicating the desired operation mode. According to one embodiment, the operation mode command is included in the window-defining trigger command. E.g., in the first operation mode, the watchdog 20 is instructed with each window-defining trigger command to generate a plurality of window sequences based on the time information included in the trigger command, while in the third operation mode the watchdog 20 is instructed with each trigger command to generate only one window sequence.

Figure 20:
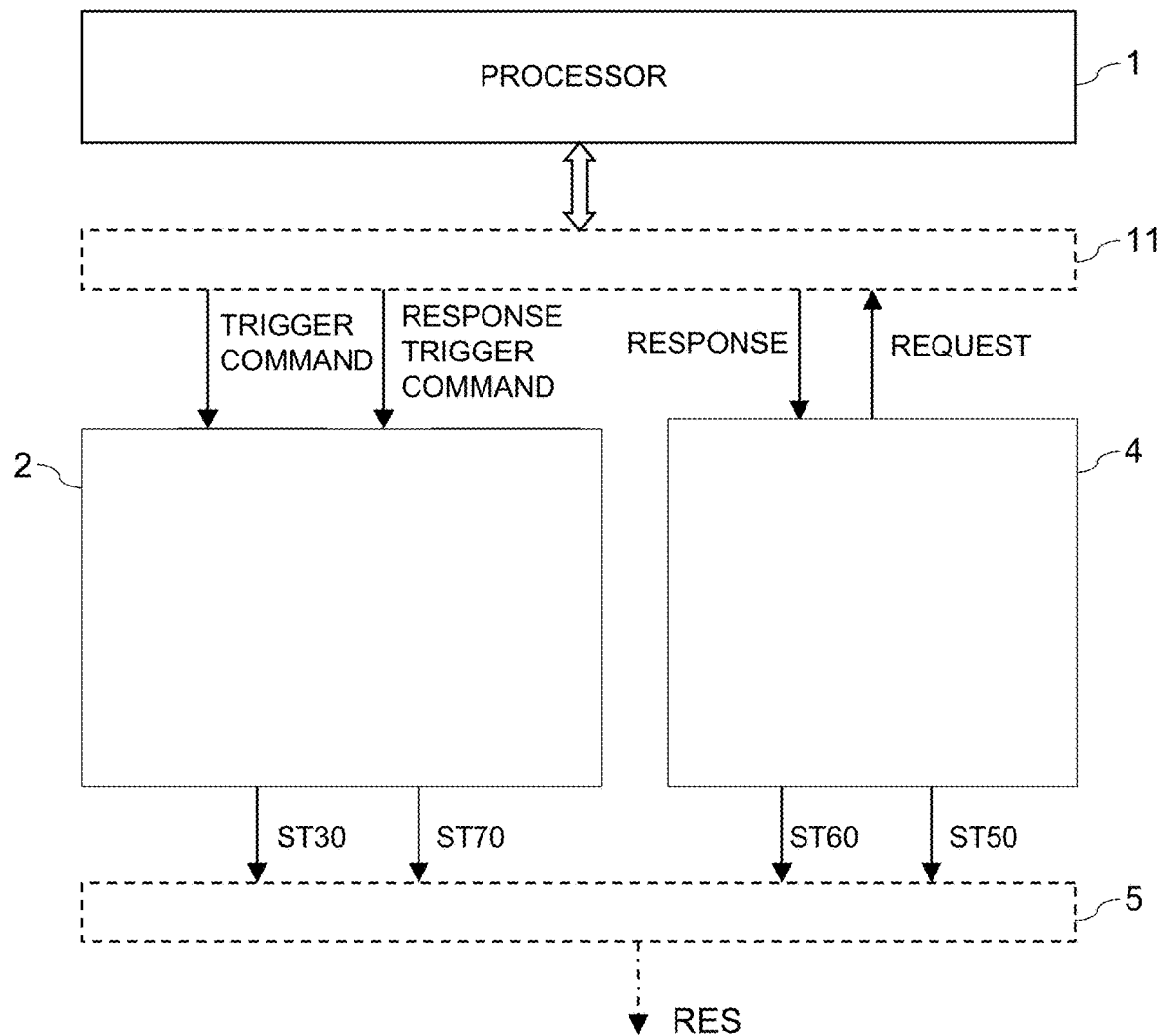
FIG. 20 shows a block diagram of a circuit arrangement with a processing unit and with two monitoring circuits according to another embodiment.

FIG. 20 shows a block diagram of a circuit arrangement with a first and a second monitoring circuit according to a further embodiment. In this embodiment, the processor is configured to direct a response to the first monitoring circuit 4 and the second monitoring circuit 2. Thus, the second monitoring circuit 2 may receive a response from the processor 1 as a trigger command, which may be a window-defining trigger command or a non-window-defining trigger command. Directing a response to both, the first and the second monitoring circuits 2, 4 helps to reduce data traffic between the processor 1 and the monitoring circuits 2, 4.

The type of trigger command that is also a response forwarded to the first monitoring circuit 4 is referred to as response trigger command in FIG. 20. The interface circuit 11 receives the response from the processor, where based on the address information included in the response the interface circuit 11 is capable of identifying that the response should be forwarded to both of the monitoring circuits. There may be no functional difference between the trigger commands explained before and the response trigger command. The only difference is that a response trigger command is also received by the first monitoring circuit 4 as s response. In this embodiment, the first monitoring circuit 4 is configured to request a response trigger command from the processor, where the corresponding response trigger command received from the processor 1 is checked in the first monitoring circuit in terms of correctness and in the window watchdog of the second monitoring circuit 2 in terms of correct timing. That is, the first monitoring circuit 2 checks if the received response trigger command matches an expected response, and the second monitoring circuit 2 checks if the received response trigger command meets timing criteria and/or uses the trigger command to define at least one window sequence.

Only some of the responses received from the processor may be response trigger commands that are received by both monitoring circuits 4, 2. The first monitoring circuit 4 may be configured to also request other responses from the processor that, through the interface circuit 11, are only forwarded to first monitoring circuit 4 where they are checked. Further, the second monitoring circuit 2 may receive trigger commands from the processor 1 other than the response trigger commands. These trigger commands are only received by the second monitoring circuit 2 where they are checked in terms of timing requirements.

In general, the first monitoring circuit 4 provides for a functionality check by requesting responses from the processor 1 and comparing the responses with expected responses, the second monitoring circuit 2 provides for a timing check by receiving trigger commands and by checking a timing of these trigger commands. There may operation scenarios in which the two monitoring circuits operate independent of each other and each receive individual responses/trigger commands, and there may be operation scenarios in which both monitoring circuits 4, 2 receive the same response trigger command.

Besides the first and second monitoring circuits 2, 4 of FIGS. 10 and 20, further monitoring circuits (not shown) may be coupled to the processing circuit 1. These further monitoring circuits may be implemented with a window watchdog or a signature watchdog and may be configured to check further functionalities of the processing circuit.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of monitoring a processing circuit, the method comprising:
   causing the processing circuit to generate a response to a request;
   comparing the response with an expected response;
   generating a pass pulse when the response matches the expected response;
   repeating the causing, comparing and generating steps a plurality of times so as to generate a sequence of pass pulses; and
   determining a frequency at which the pass pulses occur in the sequence, wherein the frequency is based on a number of pass pulses in the sequence of pass pulses in a predefined time period.

2. The method of claim 1, further comprising indicating a failure when the frequency does not meet a predefined frequency criterion.

3. The method of claim 2, further comprising providing a status signal, wherein indicating the failure comprises generating a failure level of the status signal.

4. The method of claim 2, wherein determining the frequency comprises:
   determining a mean frequency in the predefined time period; and
   comparing the mean frequency with a frequency threshold.

5. The method of claim 4, further comprising indicating the failure when the mean frequency is below the frequency threshold.

6. The method of claim 2, wherein determining the frequency comprises:
   counting the number of pass pulses in the predefined time period; and
   comparing the number with a threshold.

7. The method of claim 6, further comprising indicating the failure when the number of pass pulses is below the threshold or equal to the threshold.

8. The method of claim 7, wherein the threshold is zero.

9. The method of claim 2, wherein determining the frequency comprises:
   providing a counter and a clock signal;
   setting the counter to a start value;
   incrementing the counter using the pass pulses and decrementing the counter using the clock signal or decrementing the counter using the pass pulses and incrementing the counter using the clock signal; and
   evaluating a counter reading.

10. The method of claim 9, further comprising indicating the failure when the counter reading reaches a threshold.

11. The method of claim 1, further comprising:
    generating at least one window sequence with a closed window period and an open window period; and
    evaluating a timing of the response in view of the at least one window sequence.

12. The method of claim 11, wherein evaluating the timing of the response comprises detecting if the response is received in the open window period.

13. The method of claim 11, further comprising:
    causing the processing circuit to generate a response to each of a plurality of subsequent requests; and
    evaluating a timing of at least one response, but of less than a plurality of responses received in response to the plurality of subsequent requests.

14. A monitoring arrangement for monitoring a processing circuit, the monitoring arrangement comprising a first monitoring circuit, the first monitoring circuit configured:
    to cause the processing circuit to generate a response to a request;
    to compare the response with an expected response;
    to generate a pass pulse when the response matches the expected response;
    to repeat the cause, compare and generate a plurality of times so as to generate a sequence of pass pulses; and
    to determine a frequency at which the pass pulses occur in the sequence, wherein the frequency is based on a number of pass pulses in the sequence of pass pulses in a predefined time period.

15. The monitoring arrangement of claim 14, wherein the first monitoring circuit is further configured to indicate a failure when the frequency does not meet a predefined frequency criterion.

16. The monitoring arrangement of claim 15, wherein the first monitoring circuit is further configured
    to provide a status signal; and
    to indicate the failure by generating a failure level of the status signal.

17. The monitoring arrangement of claim 15, wherein the first monitoring circuit, in order to determine the frequency, is configured to
    determine a mean frequency in the predefined time period; and
    to compare the mean frequency with a frequency threshold.

18. The monitoring arrangement of claim 15, wherein the first monitoring circuit, in order to determine the frequency, is configured
    to count the number of pass pulses in the predefined time period; and
    to compare the number with a threshold.

19. The monitoring arrangement of claim 15, wherein the first monitoring circuit, in order to determine the frequency, is configured
    to provide a counter and a clock signal;
    to set the counter to a start value;
    to either increment the counter using the pass pulses and decrement the counter using the clock signal or to decrement the counter using the pass pulses and increment the counter using the clock signal; and
    to evaluate a counter reading.

20. The monitoring arrangement of claim 19, wherein the first monitoring circuit is further configured to indicate the failure when the counter reading reaches a threshold.

21. The monitoring arrangement of claim 14, further comprising a second monitoring circuit, the second monitoring circuit configured
    to generate at least one window sequence with a closed window period and an open window period; and
    to evaluate a timing of the response in view of the window sequence.

22. The monitoring arrangement of claim 21, wherein the second monitoring circuit is further configured to detect if the response is received in the open window period.

23. The monitoring arrangement of claim 22,
    wherein the first monitoring circuit is further configured to cause the processing circuit to generate a response to each of a plurality of subsequent requests; and
    wherein the second monitoring circuit is further configured to evaluate a timing of at least one response, but of less than a plurality of responses received in response to the plurality of subsequent requests.

24. A circuit arrangement, comprising:
a processing circuit; and
a monitoring arrangement with a first monitoring circuit, the first monitoring circuit configured:
to cause the processing circuit generate a response to a request;
to compare the response with an expected response;
to generate a pass pulse when the response matches the expected response;
to repeat the cause, compare and generate a plurality of times so as to generate a sequence of pass pulses; and
to determine a frequency at which the pass pulses occur in the sequence, wherein the frequency is based on a number of pass pulses in the sequence of pass pulses in a predefined time period.

25. The method of claim 1, wherein the request is generated by a monitoring circuit, the response is compared with the expected response by the monitoring circuit, the pass pulse is generated by the monitoring circuit, and the frequency is determined by the monitoring circuit.

26. The method of claim 25, wherein the monitoring circuit is coupled to the processing circuit via an interface circuit.

27. The method of claim 1, wherein the causing, comparing and generating steps are performed by a monitoring circuit coupled to the processing circuit.

28. The method of claim 11, wherein the at least one window sequence is generated by a monitoring circuit coupled to the processing circuit.

29. The monitoring arrangement of claim 19, wherein the monitoring arrangement is coupled to the processing circuit via an interface circuit.

30. The circuit arrangement of claim 24, wherein the monitoring arrangement is coupled to the processing circuit via an interface circuit.

31. The method of claim 2, further comprising powering down the processing circuit upon indicating the failure.

32. The monitoring arrangement of claim 15, wherein the first monitoring circuit is further configured to power down the processing circuit upon indication of the failure.

33. The circuit arrangement of claim 24, wherein the first monitoring circuit is further configured to:
indicate a failure when the frequency does not meet a predefined frequency criterion; and
cause the processing circuit to power down upon indication of the failure.

* * * * *